(12) United States Patent
Oddsen, Jr. et al.

(10) Patent No.: US 7,665,699 B2
(45) Date of Patent: Feb. 23, 2010

(54) ELECTRONIC DEVICE MOUNTING BRACKET FOR A HORIZONTAL SUPPORT

(75) Inventors: Odd N. Oddsen, Jr., Easton, PA (US);
Bradley A. Derry, Allentown, PA (US)

(73) Assignee: Innovative Office Products, Inc., Easton, PA (US)

( * ) Notice: Subject to any disclaimer, the term of this patent is extended or adjusted under 35 U.S.C. 154(b) by 664 days.

(21) Appl. No.: 10/871,799

(22) Filed: Jun. 18, 2004

(65) Prior Publication Data

US 2005/0279899 A1 Dec. 22, 2005

(51) Int. Cl.
*A47B 96/00* (2006.01)

(52) U.S. Cl. .............................. 248/224.7; 248/220.21; 248/228.1; 248/230.1; 248/230.4; 248/230.5; 248/276.1

(58) Field of Classification Search .............. 248/224.7, 248/228.1, 228.6, 228.5, 230.1, 230.4–230.6, 248/231.61, 231.51, 231.71, 205.1, 200, 248/917–924, 229.13, 287.1, 274.1, 276.1, 248/309.1, 220.21; 403/110; 224/420, 448
See application file for complete search history.

(56) References Cited

U.S. PATENT DOCUMENTS

| | | | |
|---|---|---|---|
| 3,955,788 A | 5/1976 | Delage | |
| 5,275,364 A | 1/1994 | Burger et al. | |
| 5,615,854 A * | 4/1997 | Nomura et al. | 248/287.1 |
| 5,687,939 A * | 11/1997 | Moscovitch | 248/122.1 |
| 5,732,912 A | 3/1998 | Nomura et al. | |
| 6,186,383 B1 * | 2/2001 | Kobdish | 224/420 |
| 6,270,124 B1 * | 8/2001 | Nanko | 285/15 |
| 6,349,912 B1 | 2/2002 | Schauss et al. | |
| 6,390,424 B1 * | 5/2002 | Kidushim et al. | 248/122.1 |
| 6,499,704 B2 | 12/2002 | Oddsen, Jr. | |
| 6,505,988 B1 * | 1/2003 | Oddsen, Jr. | 403/110 |
| D477,606 S * | 7/2003 | Theis et al. | D14/451 |
| 6,609,691 B2 | 8/2003 | Oddsen, Jr. | |
| 6,692,414 B1 * | 2/2004 | Gelbart et al. | 482/112 |
| 6,758,454 B2 | 7/2004 | Smed | |

OTHER PUBLICATIONS

Ergotron, Inc., Dec. 16, 2003, www.ergotron.com.*

* cited by examiner

*Primary Examiner*—J. Allen Shriver
*Assistant Examiner*—Todd M. Epps
(74) *Attorney, Agent, or Firm*—Design IP

(57) ABSTRACT

A mounting apparatus includes a horizontally supportable beam and one or more mounting brackets for coupling an electronic device thereto. The beam is supportable from any number of support surfaces. The mounting brackets are provided with a projection to prevent twisting of the bracket during installation on the beam. One or more circular ribs within the bracket accommodate the use of curved beams. The mounting brackets enable positioning of the electronic device longitudinally along the beam at predetermined positions.

18 Claims, 8 Drawing Sheets

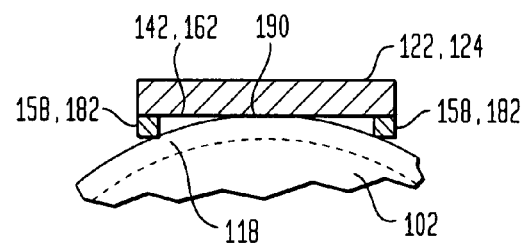
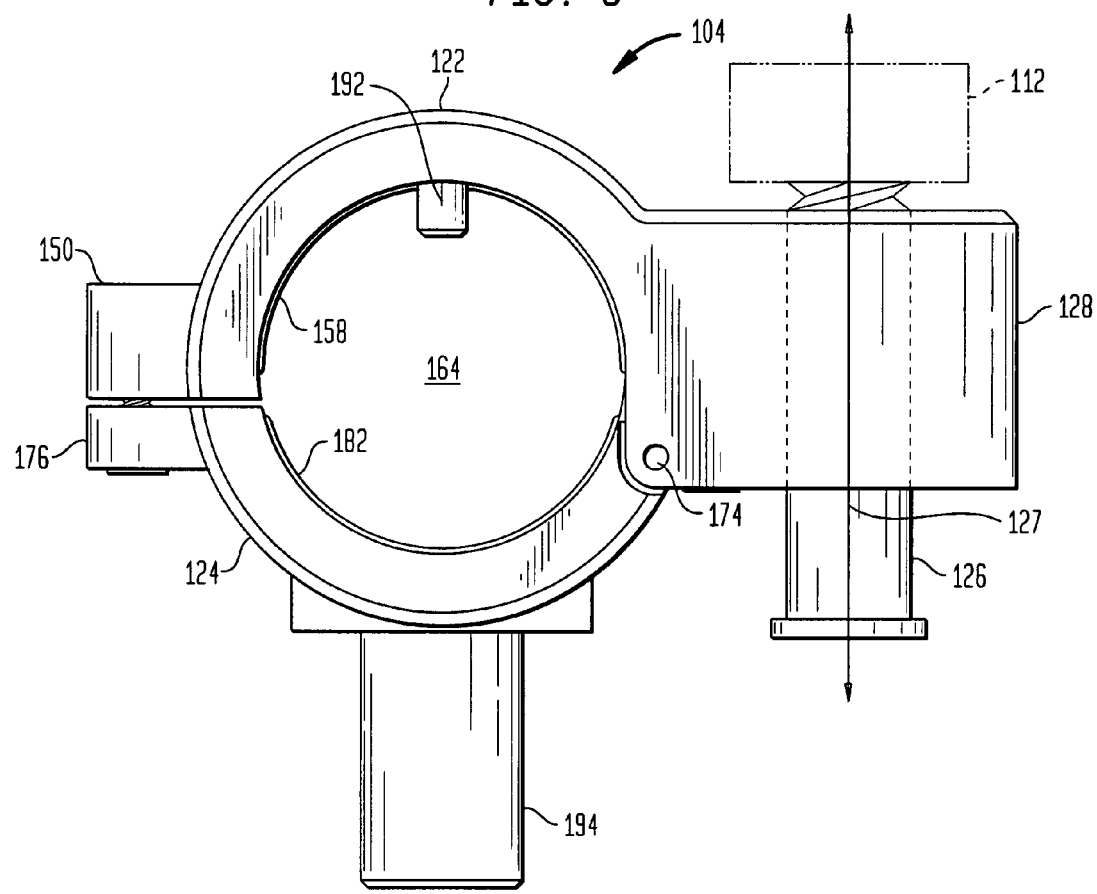

ELECTRONIC DEVICE MOUNTING BRACKET FOR A HORIZONTAL SUPPORT

BACKGROUND OF THE INVENTION

Electronic devices such as flat screen monitors or other electronic equipment are supported for use by a variety of known adjustable stands and/or extension arms. For example, there is known from U.S. Pat. No. 6,609,691 an adjustable extension arm for mounting a monitor to a supporting surface, the disclosure of which is incorporated herein by reference. The extension arm is constructed from a pair of nested channel members which form an adjustable parallelogram that permits the electronic device coupled thereto to be raised and lowered to a desired height. Such extension arms are useful when it is desired to elevate the monitor off a desk or other surface, in order that the device meets eye level or some other desired height. U.S. Pat. No. 6,499,704, the disclosure of which is incorporated herein by reference, discloses a pole stand having a base, a pole attached to the base, and a collar, which is positonable on the pole. The collar is provided with a support mount that can receive various coupling components, which may in turn be attached to an electronic device such as a monitor.

Despite these known adjustable stands and extension arms, there is the desire for further improvements in an adjustable support for an electronic device and mounting brackets for use therewith.

SUMMARY OF THE INVENTION

In accordance with an embodiment of the present invention, there is described a mounting apparatus for an electronic device, the mounting apparatus comprising an elongated beam having a longitudinal axis; and at least one bracket adapted to be coupled to an electronic device, the bracket including a body having a bore adapted to receive the beam therethrough, and a pair of spaced apart ribs extending from the body into said bore, the ribs adapted for engagement with the beam when the beam is received within the bore.

In accordance with a further embodiment of the present invention, there is described a mounting apparatus for an electronic device, the mounting apparatus comprising an elongated beam having a longitudinal axis, the beam having a bracket engagement portion; and at least one bracket adapted to be coupled to an electronic device, the bracket including an upper bracket member pivotably attached to a lower bracket member forming a bore therebetween, one of the upper and lower bracket members including a beam engagement portion accessible within the bore, the beam engagement portion coacting with the bracket engagement portion when the beam is received within the bore to prevent the bracket from twisting about the beam.

In accordance with a further embodiment of the present invention, there is described a mounting bracket adapted for coupling an electronic device to an elongated beam, the bracket comprising a body having a bore adapted to receive the beam therethrough, and a pair of spaced apart ribs extending from the aid body into the bore, the ribs adapted for engagement with the beam when the beam is received within the bore.

In accordance with a further embodiment of the present invention, there is described a mounting bracket adapted for coupling an electronic device to an elongated beam, the bracket comprising an upper bracket member pivotably attached to a lower bracket member forming a bore therebetween, one of the upper and lower bracket members including a beam engagement portion accessible within the bore, the beam engagement portion adapted for coacting with a portion of the beam when the beam is received within the bore to prevent the bracket from twisting about the beam.

In accordance with a further embodiment of the present invention, there is described a mounting bracket adapted for coupling an electronic device to an elongated beam, the bracket comprising a body having a bore adapted to receive the beam therethrough; means for preventing twisting of the body about the beam when the beam is received within the bore; and means for engaging a surface of the beam at spaced apart locations when the beam is received within the bore.

In accordance with a further embodiment of the present invention, there is described a mounting bracket adapted for coupling an electronic device to a curved elongated beam, the bracket comprising an upper bracket member pivotably attached to a lower bracket member between an open and closed position, the upper and lower bracket members forming a through bore therebetween when in the closed position, the bore having first and second spaced apart ends, first and second ribs extending from the upper and lower bracket members into the bore, the first rib arranged adjacent the first end and the second rib arranged adjacent the second end, each of the ribs having a curved inner surface adapted for engagement with a surface of the beam when received within the bore, and a beam engagement portion accessible within the bore adapted for coacting with a portion of the beam when received within the bore to prevent twisting of the bracket about the beam.

In accordance with a further embodiment of the present invention, there is described a mounting apparatus for an electronic device, the mounting apparatus comprising an elongated beam; and a mounting bracket adapted for coupling an electronic device to the elongated beam, the bracket comprising a body having a bore adapted to receive the beam therethrough, means for preventing twisting of the body about the beam when the beam is received within the bore, and means for engaging a surface of the beam at spaced apart locations when the beam is received within the bore.

In accordance with a further embodiment of the present invention, there is described a mounting apparatus for an electronic device, the apparatus comprising a curved elongated beam having a longitudinal axis, the beam having a bracket engagement portion extending along the axis; and at least one mounting bracket adapted for coupling an electronic device to the beam, the bracket comprising an upper bracket member pivotably attached to a lower bracket member between an open and closed position, the upper and lower bracket members forming a through bore therebetween when in the closed position, the bore having first and second spaced apart ends, first and second ribs extending from the upper and lower bracket members into the bore, the first rib arranged adjacent the first end and the second rib arranged adjacent the second end, each of the ribs having a curved inner surface adapted for engagement with a surface of the beam when received within the bore, and a beam engagement portion accessible within the bore adapted for coacting with the bracket engagement portion of the beam when received within the bore to prevent twisting of the bracket about the beam.

In accordance with a further embodiment of the present invention, there is described a mounting apparatus for adjusting the elevation of an electronic device coupled thereto, the mounting apparatus comprising an elongated beam having a longitudinal axis; and at least one bracket adapted to be coupled to an electronic device, the bracket including a body having a bore adapted to receive the beam therethrough, and means for adjusting the elevation of an electronic device when coupled thereto relative to the body.

In accordance with a further embodiment of the present invention, there is described a mounting apparatus for adjusting the elevation of an electronic device coupled thereto, the mounting apparatus comprising an elongated beam having a longitudinal axis; and at least one bracket adapted to be coupled to an electronic device, the bracket including a body having a threaded opening and a bore adapted to receive the beam therethrough, and an externally threaded bushing having an opening at one end thereof, the bushing threadingly received within the threaded opening within the body; and a coupling device received within the opening of the bushing for coupling an electronic device to the bracket, whereby the elevation of the electronic device can be adjusted by advancing the bushing through the body by rotation of the bushing.

In accordance with a further embodiment of the present invention, there is described a mounting bracket for adjusting the elevation of an electronic device coupled thereto, the bracket comprising a body adapted for coupling an electronic device thereto, and means for adjusting the elevation of an electronic device when coupled thereto relative to the body.

In accordance with a further embodiment of the present invention, there is described a mounting bracket for adjusting the elevation of an electronic device coupled thereto, the bracket comprising a body having a threaded opening, and an externally threaded bushing having an opening at one end thereof, the bushing threadingly received within said threaded opening within the body; and a coupling device received within the opening of the bushing for coupling an electronic device to the body, whereby the elevation of the electronic device can be adjusted by advancing the bushing through the body by rotation of the bushing.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIG. 8 is a diagrammatical illustration showing the relationship of a mounting bracket coupled to a curved elongated beam in accordance with one embodiment of the present invention;

FIG. 9 is a front elevational view of a mounting bracket constructed in accordance with another embodiment of the present invention;

DETAILED DESCRIPTION OF THE PREFERRED EMBODIMENTS

Figure 1:
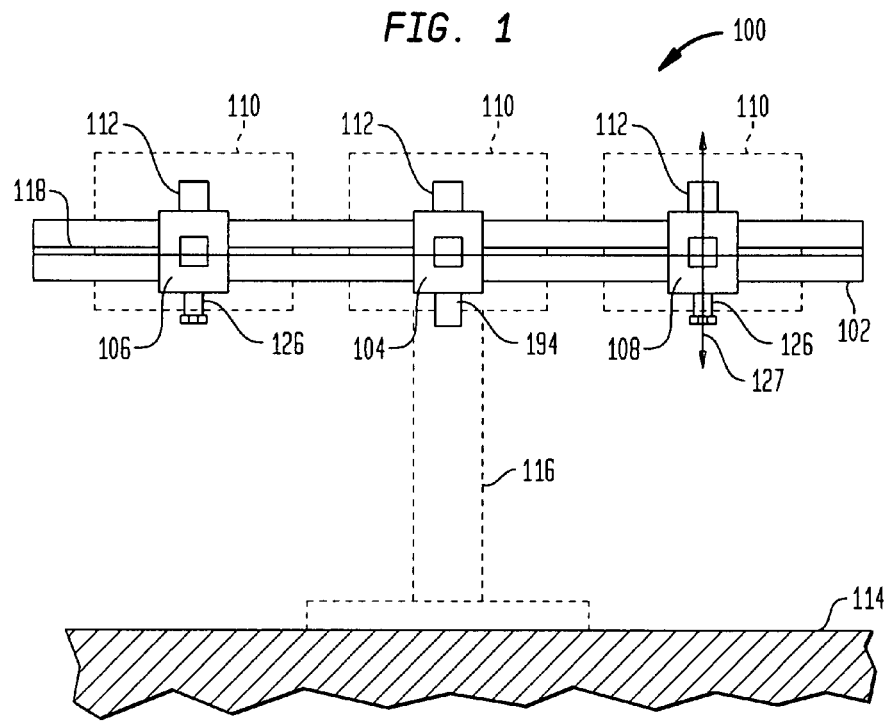
FIG. 1 is a front elevational view of a mounting apparatus constructed in accordance with one embodiment of the present invention.

In describing the preferred embodiments of the invention illustrated in the drawings, specific terminology will be used for the sake of clarity. However, the invention is not intended to be limited to the specific terms so selected, and it is to be understood that each specific term includes all technical equivalents that operate in a similar manner to accomplish a similar purpose.

Referring now to the drawings, wherein like reference numerals represent like elements, there is shown in FIG. 1 a mounting apparatus generally designated by reference numeral 100. The mounting apparatus 100 includes an elongated beam 102 and at least one mounting bracket for use therewith. In the embodiment shown in FIG. 1, the mounting apparatus 100 includes a plurality of mounting brackets 104, 106, 108, whose construction will be described hereinafter. An electronic device such as a flat screen monitor 110 is coupled to each of the mounting brackets by means of, for example, a tilter device 112 such as known from U.S. Pat. No. 6,505,988, the disclosure of which is incorporated herein by reference. The beam 102 is supported in a horizontal orientation overlying floor 114 by means of a stand 116. As to be described hereinafter, the beam 102 may be also be supported from the ceiling, vertical wall or office furniture as may be desired.

Figure 2:
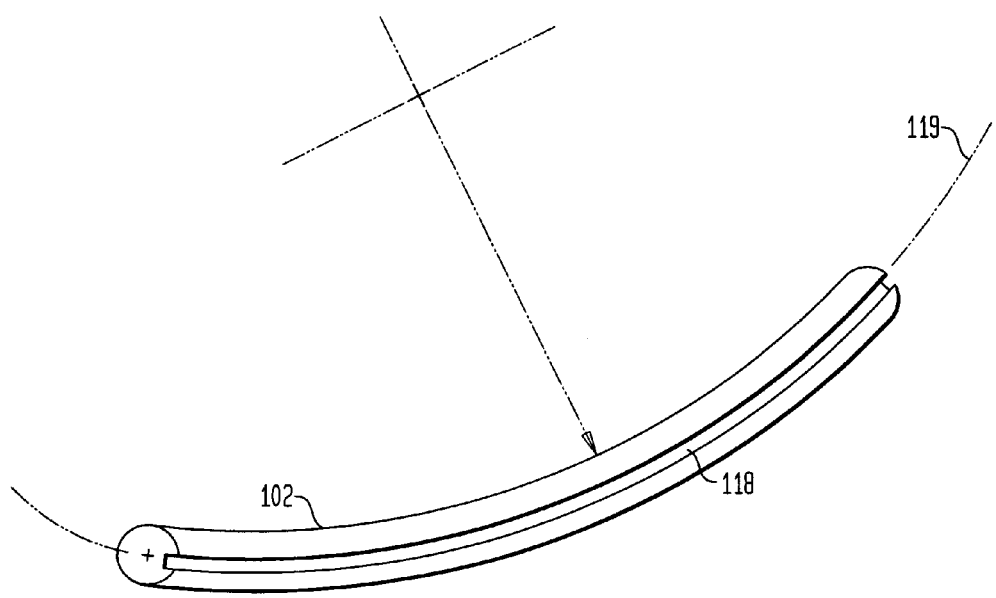
FIG. 2 is a perspective view of an elongated beam adapted for use in the mounting apparatus in accordance with one embodiment of the present invention.

Referring to FIG. 2, there is illustrated one embodiment of a beam 102 adapted for supporting an electronic device via a mounting bracket. The beam 102 is constructed as an elongated member having a circular cross-section and a predetermined radius of curvature. The beam 102, as shown, is constructed as a solid beam from a lightweight metal such as aluminum and the like. It is contemplated that the beam 102 may be constructed from other materials such as plastics and reinforced plastics, as well as a hollow tubular member or a hollow tubular member that is filled with a secondary material such as a metal or plastic filler.

In the preferred embodiment, the beam 102 has a circular cross-sectional shape. This facilitates bending of the beam 102 to the desired radius of curvature. However, it is contemplated that the beam 102 may have other geometric shapes, for example, polygonal, square, oval and the like. Although the beam 102 has a predetermined radius of curvature in accordance with the preferred embodiment, it is to be understood that the beam may also be linear without a radius of curvature if so desired.

The beam 102 is provided with a bracket engagement portion in the nature of an elongated slot 118. The cross-sectional shape of the slot 118 may have various forms, for example, rectangular, keyhole, polygonal and the like. The slot 118 is provided extending along the longitudinal axis 119 of the beam generally arranged at its mid-point, for example, in alignment with the diameter of the beam 102. As shown, the slot 118 is formed on the side of the beam 102 having the larger radius of curvature, i.e., outwardly of the beam. However, it is contemplated that the slot 118 may also be provided on the surface of the beam having the smaller radius of curvature, i.e., facing inwardly. Although the slot 118 has been shown as a continuous slot form one end of the beam 102 to the other, it is contemplated that the slot may be formed as segments which are discontinuous.

Figure 3:
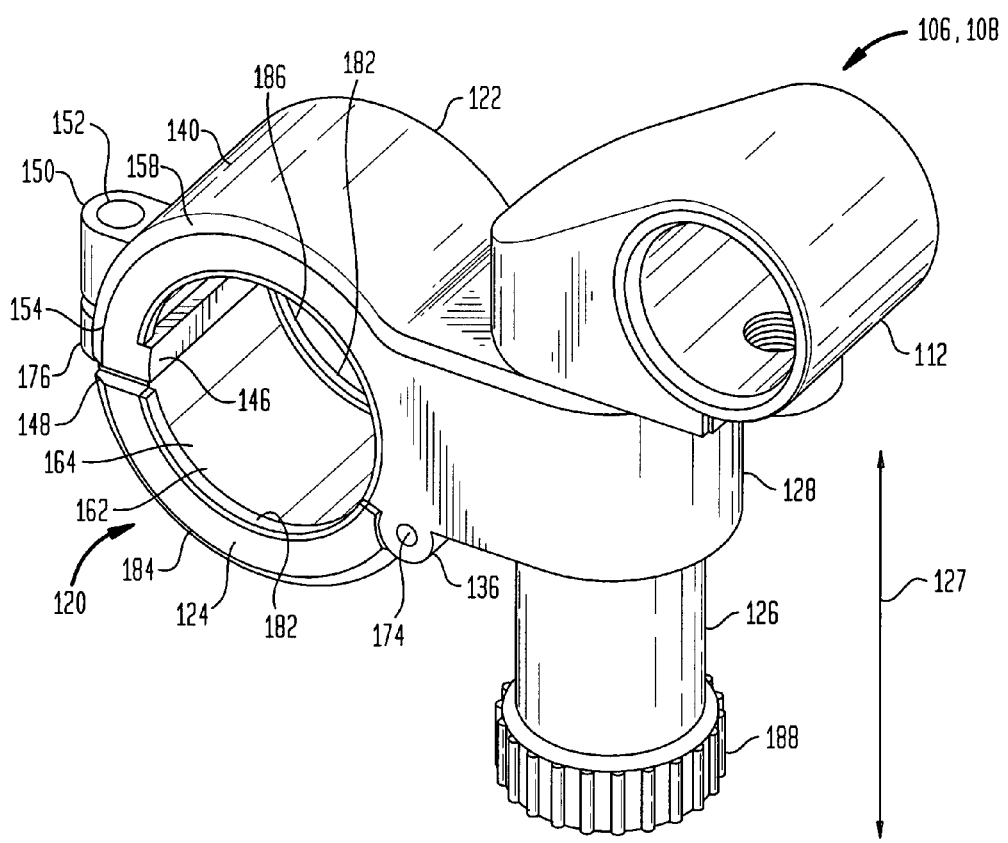
FIG. 3 is a perspective view of a mounting bracket constructed in accordance with one embodiment of the present invention.
Figure 4:
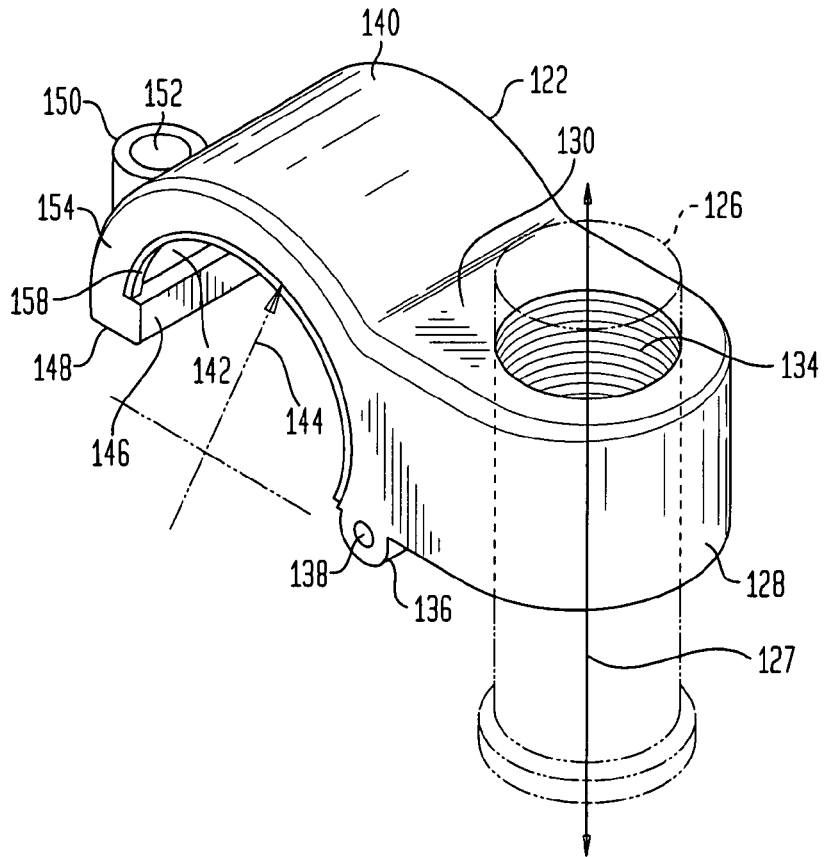
FIG. 4 is a perspective view, looking from above, of the upper bracket member of the mounting bracket shown in FIG. 3.

Referring now to FIGS. 3 through 6, there will be described a mounting bracket constructed in accordance with one embodiment of the present invention. The mounting brackets 106, 108 are adapted to be slid along the beam 102 for securing at a predetermined location. On the other hand, the mounting bracket 104 is intended to have a fixed location along the beam 102. The construction of the mounting bracket 104 will be described hereinafter. As best shown in FIG. 3, the mounting brackets 106, 108 are constructed from a body 120 which includes an upper bracket member 122 and a lower bracket member 124, and optionally, a bushing 126.

The upper bracket member 122 includes a boss 128 having an upper surface 130 and a lower surface 132. A threaded opening 134 extends through the boss 128 between the upper and lower surfaces 130, 132. A pair of spaced apart ribs 136 having an aligned through bore 138 are provided extending away from the lower surface 132 adjacent one end of the boss 128.

An arcuate shaped member 140 extends away from the boss 128 having an inner curved surface 142. The curved surface 142 is formed by a radius generally corresponding to the radius of the cylindrical beam 102. In this regard, the shape of the inner surface 142 conforms to the shape of the beam 102. In an embodiment where the beam 102 is polygonal in cross-sectional shape, the inner surface 142 of the upper bracket 142 will have a corresponding polygonal shape.

A projection 146 extends inwardly from the forward edge 148 of the arcuate shaped member 140. The projection 146 is an elongated body having a cross-sectional shape generally conforming to the cross-sectional shape of the slot 118 formed in beam 102. In this regard, the projection 146 is adapted to extend into the slot 118, whereby the mounting bracket may slide longitudinally along the beam 102 while the projection is engaged within the slot. Thus, it is not a requirement that the projection 146 have the same corresponding shape as the slot 118. Although the projection 146 has been shown as a single elongated body, it is contemplated that the projection may be formed from spaced apart segments, or a single projection whose length is shorter than the length of the arcuate shaped member 140. The projection 146 extends inwardly into the opening formed by the inner curved surface 142 of the arcuate shaped member 140.

The arcuate shaped member 140 includes a boss 150 formed outwardly thereof proximate the forward edge 148. The boss 150 includes an opening 152 which may be threaded or non-threaded. As will be described hereinafter, the boss 150 is part of a locking assembly operative for securing the upper and lower bracket members 122, 124 in assembled relationship about the beam 102.

As thus far described, the arcuate shaped member 140 has an inner curved surface 142 which is generally planar between its spaced apart edges 154, 156. An elongated curved rib 158 extends projecting inwardly from the inner curved surface 142 of the arcuate shaped member 140 adjacent each edge 154, 156. The ribs 158 generally have a radius of curvature center corresponding to the radius of curvature center of the inner curved surface 142 of the arcuate shaped member 140. As such, the outer edge of the ribs 158 generally lie in a circular plane parallel to the circular plane concentric with the inner curved surface 142. Although the ribs 158 have been illustrated as continuous ribs substantially co-extensive with the edges 154, 156 of the inner curved surface 142, it is contemplated that the ribs may be formed as spaced apart segments. Although the ribs generally have a rectangular cross-sectional shape, they may have other shapes such as polygonal, triangular, trapezoidal or the like.

Figure 6:
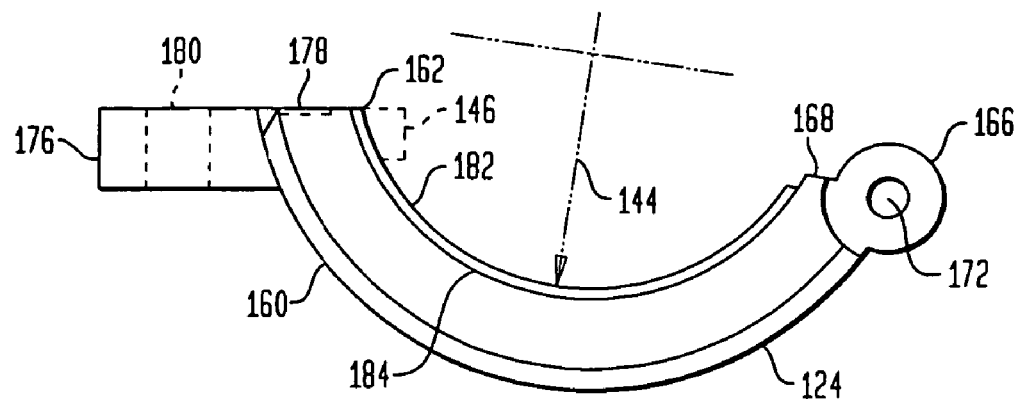
FIG. 6 is a front elevational view of the lower bracket member of the mounting bracket shown in FIG. 3.

The lower bracket member 124 will now be described with reference to FIG. 6. The lower bracket member 124 includes an arcuate shaped member 160 having an inner curved surface 162. The inner curved surface 162 is defined by a radius of curvature generally corresponding to the radius of curvature of the inner curved surface 142 of the arcuate shaped member 140. The inner curved surface 162 is generally of similar shape to inner curved surface 142 so as to conform with the cross-sectional shape of the beam 102. In this regard, the upper and lower bracket members 122, 124 when in their assembled closed relationship as shown in FIG. 3 define a through bore 164 having the general cross-sectional shape as the beam 102. In the preferred embodiment, the bore 164 has a circular shape, although other shapes are contemplated as previously described, and wherein the longitudinal axis of the bore is arranged transverse to the longitudinal axis of the threaded opening 134 in boss 128.

Figure 5:
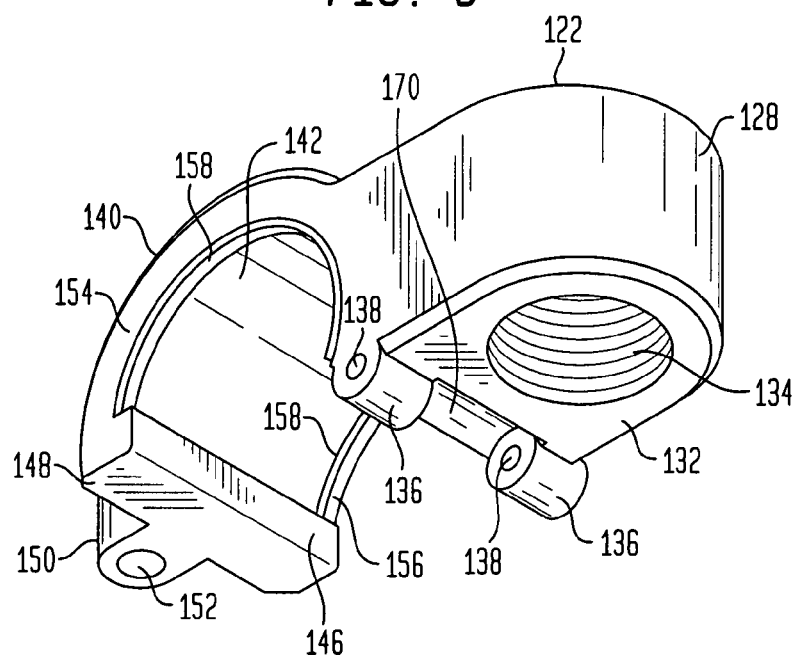
FIG. 5 is a perspective view, looking from below, of the upper bracket member of the mounting bracket shown in FIG. 3.

A rib 166 is formed extending outwardly from a central portion of one end 168 of the lower bracket member 124. The rib 166 is adapted to be rotationally received within the opening 170 formed between the spaced apart ribs 136 on the upper bracket member 122 as best shown in FIG. 5. Rib 166 includes a through bore 172 which aligns with bore 138 within ribs 136 so as to receive an axle 174 for pivotably attaching the upper and lower bracket members 122, 124 together.

A boss 176 is provided extending outwardly from the other end 178 of the arcuate shaped member 160. The boss 176 has a through opening 180 which may be threaded or unthreaded. In assembled relationship, the openings 152, 180 are aligned with each other so as to accommodate a bolt, screw or other attachment means for securing the upper and lower bracket members 122, 124 together in fixed assembled relationship. It is to be understood that other locking assemblies may be used such as clamps, hooks or other fasteners, both threaded and non-threaded, for securing the upper and lower bracket members 122, 124 together.

An elongated curved rib 182 similar in construction to rib 158 is provided projecting inwardly from the inner curved surface 162 of the arcuate shaped member 160 adjacent its side edges 184, 186. The ribs 158, 182 of the corresponding upper and lower bracket members 122, 124 cooperate with each other to define the radial limits of the bore 164 formed thereby.

The projection 146 has been described as being formed extending inwardly from the upper bracket member 122. It is to be understood that the projection 146 may be formed, in the alternative, extending inwardly from the lower bracket member 124. It is further contemplated that a secondary projection 146 may be formed extending from the lower bracket member 124 to cooperate with the projection of the upper bracket member 124 so as to both be received within the slot 118 of the beam 102.

The mounting brackets 106, 108 are shown in assembled relationship in FIG. 3. As previously described, the lower bracket member 124 is pivotably coupled to the upper bracket member 122 by an axle 174 extending through the aligned bores 138, 172 of the nested ribs 136, 166. This permits the mounting brackets 106, 178 to be positioned about the beam 102 with the projection 146 extending into the slot 118. The upper and lower bracket members 122, 124 are secured together, by, for example, a bolt or screw extending through the aligned openings 152, 180 of the overlying bosses 150, 176, or other such clamping assembly.

The bushing 126, as best shown in FIG. 3, is constructed as a generally hollow tubular body having external threads at least about an upper portion of the bushing. The bushing 126 is adapted to be threadingly engaged within the threaded opening 134 within the upper bracket member 122. The lower end of the bushing 126 is provided with an enlarged knob 188. The knob 188 facilitates rotation of the bushing 126, by hand, so as to advance and retract the bushing within the upper bracket member 122. The bushing 126 is operative for supporting an electronic device by coupling same via, for example, a coupling device such as a tilter device 112, forearm extension, extension arm or other such coupling device. The tilter device 112 is partially shown in FIG. 3 having a downwardly depending shaft (not shown) received within the upper opening provided within the bushing 126. The adjustability of the bushing 126 is operative, as shown by arrow 127, for raising and lowering the height or elevation of the electronic device which is coupled to the mounting bracket 106, 108. This is useful to align each of the electronic devices at the same elevation.

Figure 7:
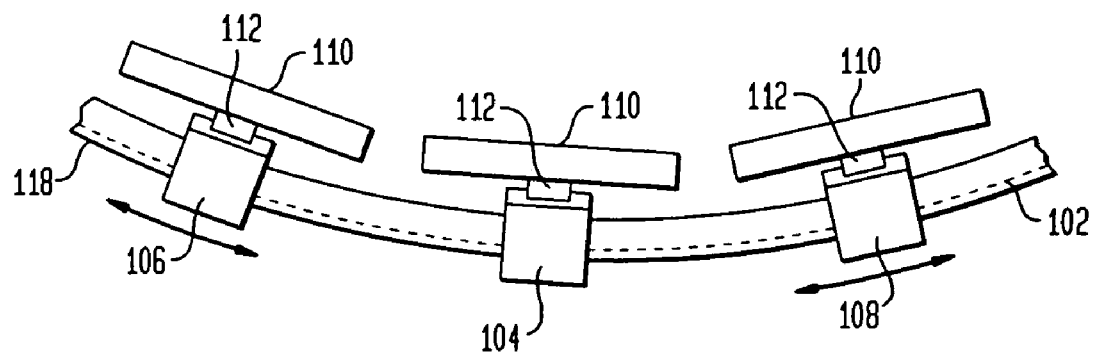
FIG. 7 is a top plan view illustrating a plurality of electronic devices mounted to a curved elongated beam using a mounting bracket constructed in accordance with one embodiment of the present invention.

Referring to FIG. 7, there is illustrated the mounting brackets 106, 108 coupled to a beam 102. In this regard, the upper and lower bracket members 122, 124 are pivotably opened to receive the beam 102. The upper bracket member 122 is positioned about the top half of the beam 102 with the projection 146 captured within the slot 118. The projection 146 temporarily attaches the upper bracket member 122 to the beam 102 while the lower bracket member 124 is pivoted into a closed position encircling the beam. A threaded bolt received within the aligned bosses 150, 176 brings the upper and lower bracket members 122, 124 together in a clamping action about the beam 102. Prior to final clamping, the brackets 106, 108 can be slid along the beam 102 with projection 146 extending within the slot 118 to position the bracket at the desired location. Once positioned, the mounting brackets 106, 108 are firmly secured to the beam by tightening the bolt or other clamping assembly as previously described.

A flat screen monitor 110 is coupled to each of the mounting brackets 106, 108 via, for example, a tilter device 112. However, other coupling devices such as an extension arm, forearm extension or other suitable assembly may be used as disclosed in U.S. Pat. No. 6,609,691. As shown in FIG. 1, the bushing 126 is used to raise or lower each of the monitors 110 as shown by arrow 127 so that they are arranged at the desired elevation. In the preferred embodiment, each of the monitors 110 are arranged in a common horizontal plane with their upper and lower edges in alignment with one another. The height adjustment of each of the monitors 110 is achieved by rotating the bushing 126 via knob 188. Any number of mounting brackets 106, 108 may be coupled to the beam 102, depending upon its length, to accommodate a plurality of monitors 110 or other electronic device.

Referring to FIG. 8, the upper and lower bracket members 122, 124 have planar inner curved surfaces 142, 162 forming a cylindrical shape. As the beam 102 has a radius of curvature, the outer surface of the beam engages the inner curved surfaces 142, 162 of the upper and lower bracket members 122, 124 generally at a single midpoint identified by reference numeral 190. The ribs 158, 182 by extending from the side edges of the inner curved surfaces 142, 162 engage the outer surface of the beam 102 at two spaced apart circumscribing locations. The engagement of the ribs 158, 182 with the beam 102 provides enhanced mechanical coupling of the mounting brackets to the beam via the compressive force exerted thereon by the upper and lower bracket members 122, 124. This simplifies the construction of the mounting brackets. In an alternative embodiment, the curved inner surfaces 142, 162 could be in the nature of a compound curve to accommodate both the cross-sectional shape of the beam 102, as well as its radius of curvature.

Referring to FIG. 9, there will now be described the construction of a mounting bracket 104 in accordance with another embodiment of the present invention. As previously described, the mounting brackets 106, 108 are adapted to slide along the beam 102 for positioning at a desired location. The mounting bracket 104, on the other hand, is adapted to be positioned at a fixed predetermined location along the beam 102. To this end, the mounting bracket 104 is provided with a depending projection 192 extending away from the inner curved surface 142 of the upper bracket member 122. The projection 192 may have a shape conforming to the shape of a corresponding opening (not shown) provided within the beam 102. For example, projection 192 has a circular shape to be received within a circular opening within the beam 102. However, it is noted that a circular projection 192 will fit within a square or polygonal shaped opening within the beam 102. The opening within the beam 102 is formed at one or more predetermined locations for coupling the mounting bracket 104 thereat. It is also contemplated that the projection 192 can be provided extending from the lower bracket member 124 if desired. The construction of the mounting bracket 104 to include projection 192 typically obviates the need for providing a projection 146 as described with respect to mounting brackets 106, 108 which is adapted to be received within the slot 118 of the beam 102. Although only one projection 192 is illustrated, it is to be understood that spaced apart projections can also be incorporated into the mounting bracket 104. A downwardly depending shaft 194 extends outwardly from the lower bracket member 124. The shaft 194 is adapted to be received within a stand 116 for supporting the beam 102 in a horizontal orientation as shown in FIG. 1. Generally, in all other respects, mounting bracket 104 is similar in construction to mounting brackets 106, 108.

Mounting bracket 104, in one embodiment, is positioned centrally along the beam 102 at its mid point to support the beam via a stand 116 supported on the floor 114, or attached to the ceiling, or a vertical wall. It is also contemplated that the beam 102 can be supported from a desk or other structure as may be desired. It is contemplated that the beam 102 may be supported by the use of a plurality of mounting brackets 104 arranged at spaced apart locations, each coupled to a stand 114 or other support structure, with or without the use of the slideable mounting brackets 106, 108. Accordingly, the mounting brackets 104, 106 and 108 may be used in combination with each other for supporting an electronic device such as a flat screen monitor 110 and the like at various locations along the beam 102.

Figure 10:
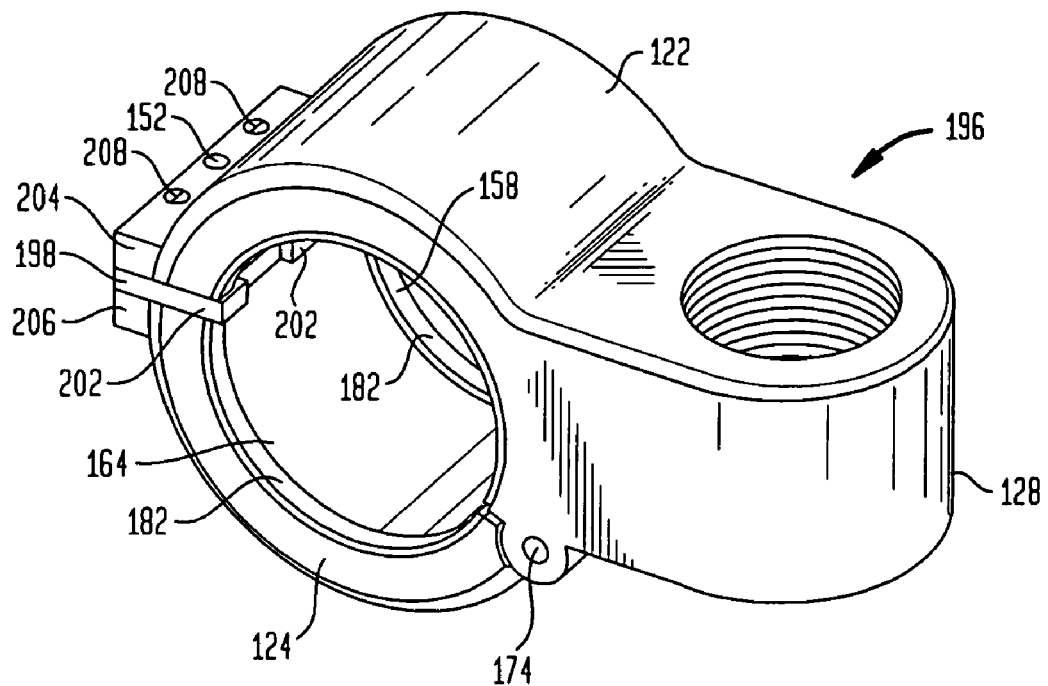
FIG. 10 is a perspective view of a mounting bracket constructed in accordance with another embodiment of the present invention.
Figure 11:
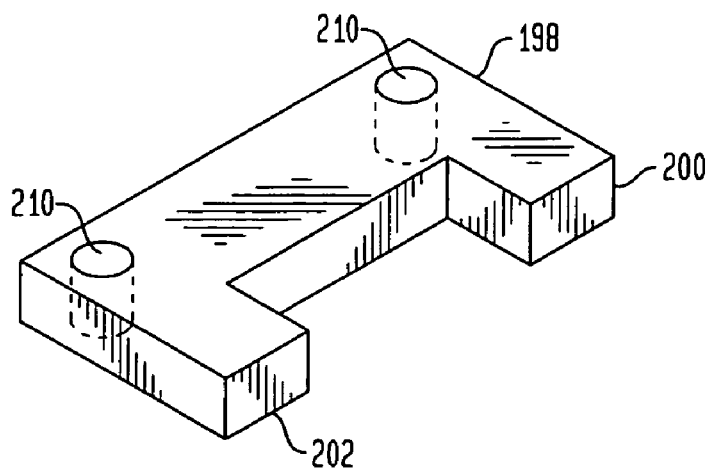
FIG. 11 is a perspective view of the projection shown in the mounting bracket shown in FIG. 10.

Referring to FIG. 10, there is illustrated another embodiment of a mounting bracket 196. The mounting bracket 196 is of similar construction to mounting bracket 106, 108 as previously described. The mounting bracket 196 is constructed to include a removable projection 198 which is shown in greater detail in FIG. 11. The projection 198 is formed as a flat body having a u-shape by virtue of a pair of spaced apart legs 200, 202. The legs 200, 202 are sized and shaped to be received within the slot 118 of the beam 102.

The projection 198 is located between the free ends of the upper and lower bracket members 122, 124 whereby the legs 200, 202 extend inwardly into the bore 168 formed by the upper and lower bracket members. The main body of the projection 198 is attached to either an upper or lower boss 204, 206 of the mounting bracket 196 having openings 208 in alignment with corresponding openings 210 within the projection 198. A screw, bolt or other fastening member may be inserted through the aligned openings for securing the projection 198 to either the upper bracket member 122 or lower bracket member 124. Generally, in all other respects, the construction of the mounting bracket 196 is similar to the mounting brackets 106, 108. Although the projection 198 has been disclosed as having U-shaped, the projection may also be constructed as a rectangular body simulating projection 146.

Figure 12:
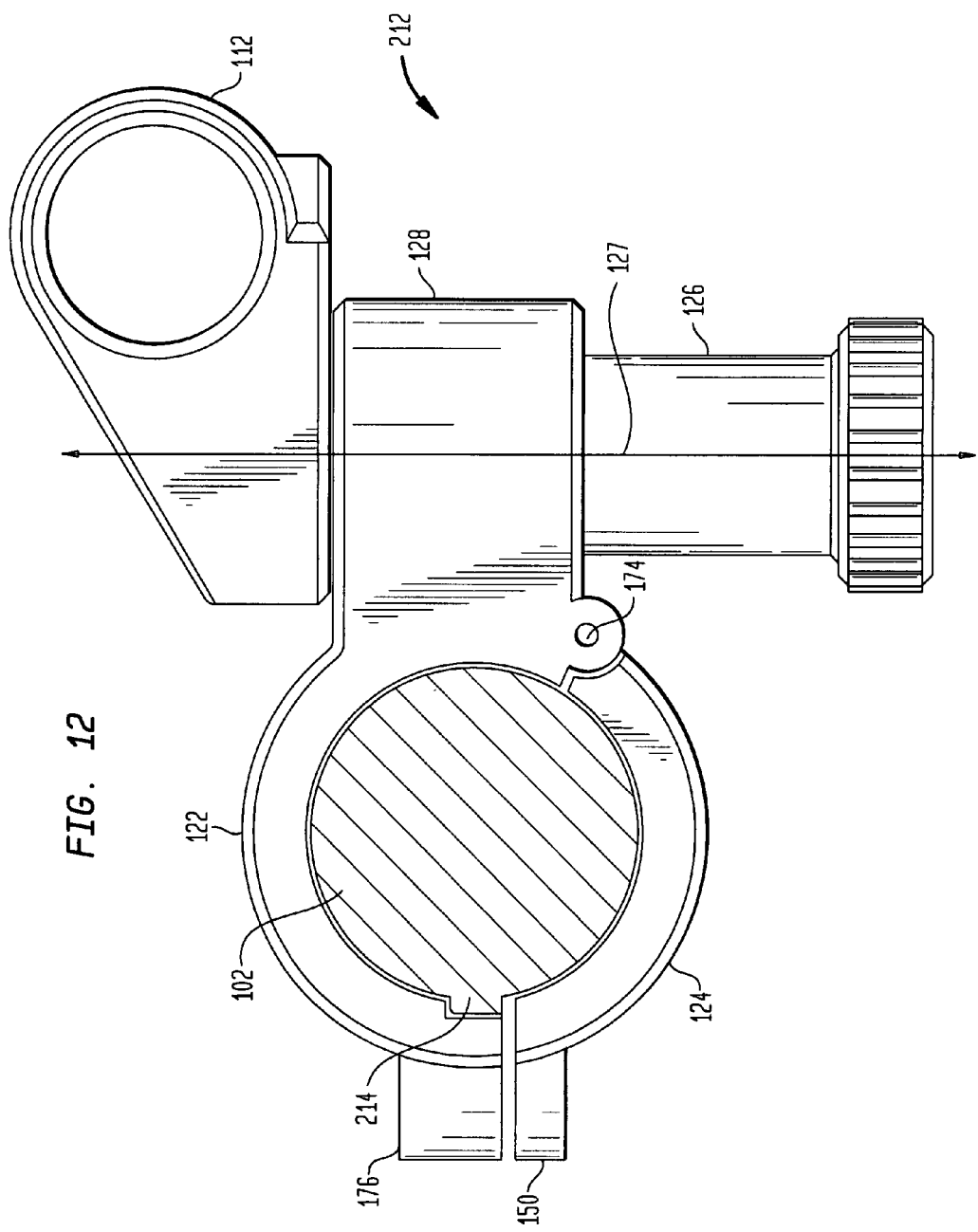
FIG. 12 is a front elevational view of a mounting bracket constructed in accordance with another embodiment of the present invention.

A mounting bracket 212 in accordance with another embodiment of the present invention is shown in FIG. 12. The mounting bracket 212 is constructed to accommodate a beam 102 provided with an outwardly projecting longitudinally extending rib 214, as opposed to a slot 118. In this regard, the inner curved surface 142, 162 of either of the upper or lower mounting bracket members 122, 124 is provided with a corresponding elongated opening 216. Generally, in all other respects, the mounting bracket 212 is similar in construction to the aforementioned mounting brackets.

Figure 13:
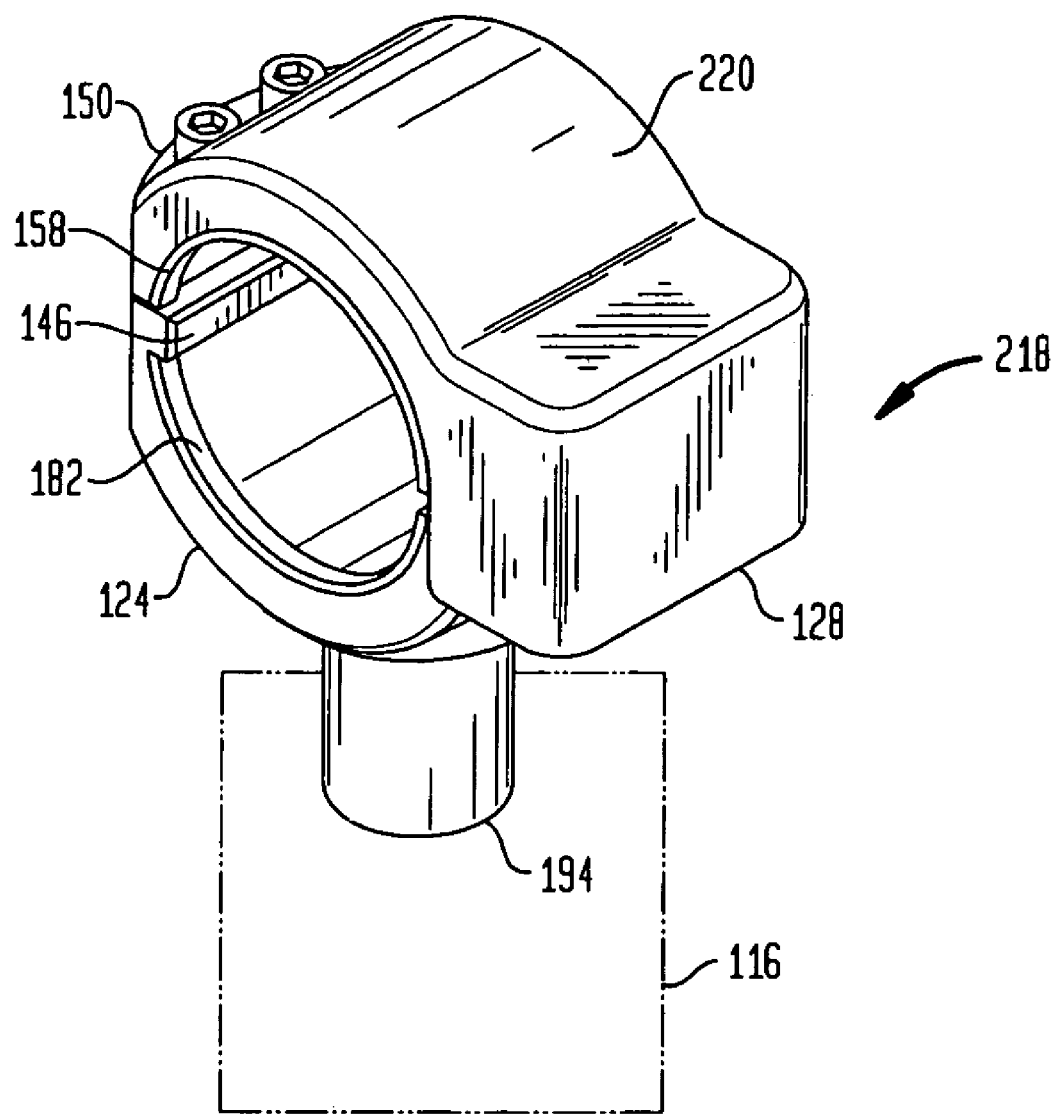
FIG. 13 is a perspective view of a mounting bracket constructed in accordance with another embodiment of the present invention.

Referring to FIG. 13, there is illustrated another embodiment of a mounting bracket 218. Unlike the previously described mounting brackets, mounting bracket 218 is not intended to couple an electronic device thereto, but rather, to couple the beam 102 to, for example, stand 116 or other supporting structure or device. The mounting bracket 218 includes an upper bracket member 220 and a lower bracket member 124. The construction of the lower bracket member 124 has been previously described with respect to FIG. 6. As shown in FIG. 13, the lower bracket member 124 includes a projection 146 and a downwardly depending shaft 194 as described with respect to the mounting bracket shown in FIG. 9. The upper bracket member 220 is similar in construction to the upper bracket member 122 as described with respect to FIGS. 4 and 5, but for the projection 146 and threaded opening 134. However, as previously described, the projection 146 may be incorporated in either the upper or lower bracket members. The upper bracket member 220 is devoid of threaded opening 134, as the mounting bracket is not intended to be coupled to an electronic device. The upper bracket 220 member is constructed to be pivotably attached to the lower bracket member 124 in lieu of the upper bracket member 122 having the threaded opening 134. This minimizes the number of components required to be inventory when assembling a mounting bracket. As such, the lower bracket member 124 may be coupled to either of the upper bracket members depending upon the application of the mounting bracket.

Mounting bracket 218 allows for the independent mounting of electronic devices to the beam 102, separate and apart from the mounting brackets used for mounting the beam to a support. This facilitates the adjustment of the electronic devices relative to each other along the beam 102. That is, manipulation of the mounting bracket to adjust an electronic device does not affect the position or attachment of the mounting bracket used to attach the beam 102 to a support.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A mounting apparatus for an electronic device, said mounting apparatus comprising an elongated beam having a curved longitudinal axis, said beam having an outer surface and a bracket engagement portion; at least one bracket adapted to be coupled to an electronic device, said bracket including an upper bracket member pivotably attached to a lower bracket member forming a linear bore therebetween, one of said upper and lower bracket members including a beam engagement portion accessible within said bore, wherein said bracket engagement portion comprises a slot and said beam engagement portion comprises a projection adapted to be received within said slot, said beam engagement portion coacting with said bracket engagement portion when said beam is received within said bore to prevent said bracket from twisting about said beam; first and second ribs extending from said upper and lower bracket members into said bore, said first ribs spaced longitudinally from said second ribs within said bore, said first and second ribs each having a curved edge surface adapted for engagement with said outer surface of said beam when said beam is received within said bore.

2. The mounting apparatus of claim 1, wherein said beam is cylindrical in cross-sectional shape.

3. The mounting apparatus of claim 1, wherein said bracket includes a locking assembly for securing said upper bracket member to said lower bracket member when in said closed position.

4. The mounting apparatus of claim 1, wherein said bracket further includes an opening and a bushing received within said opening.

5. The mounting apparatus of claim 4, wherein said bushing is threadingly received within said opening whereby the position of said bushing relative to said bracket is adjustable.

6. The mounting apparatus of claim 1, further including a support coupled to said beam for positioning said beam in a horizontal plane.

7. A mounting apparatus for an electronic device, said mounting apparatus comprising an elongated beam having a curved longitudinal axis, said beam having an outer surface and a bracket engagement portion; at least one bracket adapted to be coupled to an electronic device, said bracket including an upper bracket member pivotably attached to a lower bracket member forming a linear bore therebetween, one of said upper and lower bracket members including a beam engagement portion accessible within said bore, wherein said beam engagement portion comprises a shaped projection extending from said bracket within said bore and said bracket engagement portion comprises a corresponding shaped opening within said beam adapted to receive said projection, whereby said bracket is further prevented from sliding along said beam, said beam engagement portion coacting with said bracket engagement portion when said beam is received within said bore to prevent said bracket from twisting about said beam; first and second ribs extending from said upper and lower bracket members into said bore, said first ribs spaced longitudinally from said second ribs within said bore, said first and second ribs each having a curved edge surface adapted for engagement with said outer surface of said beam when said beam is received within said bore.

8. A mounting apparatus for an electronic device, said apparatus comprising a curved elongated beam having a longitudinal axis, said beam having a bracket engagement portion extending along said axis; and at least one mounting bracket adapted for coupling an electronic device to said beam, said bracket comprising an upper bracket member pivotably attached to a lower bracket member between an open and closed position, said upper and lower bracket members forming a through bore therebetween when in said closed position, said bore having first and second spaced apart ends, first and second ribs extending from said upper and lower bracket members into said bore, said first rib arranged adjacent said first end and said second rib arranged adjacent said second end, each of said ribs having a curved inner surface adapted for engagement with a surface of said beam when received within said bore, and a beam engagement portion accessible within said bore adapted for coacting with said bracket engagement portion of said beam when received within said bore to prevent twisting of said bracket about said beam, wherein said bracket engagement portion comprises a slot and said beam engagement portion comprises a projection.

9. The apparatus of claim 8, wherein said bracket further includes an opening and a bushing received within said opening.

10. The apparatus of claim 9, wherein said bushing is threadingly received within said opening whereby the position of said bushing relative to said bracket is adjustable.

11. A mounting apparatus for an electronic device, said mounting apparatus comprising:
an elongated beam having a curved longitudinal axis, said beam having an outer surface; and
at least one bracket adapted to be coupled to an electronic device, said bracket including:
a body having a bore extending between first and second spaced apart ends thereof and adapted to receive said beam therethrough, wherein said beam includes a bracket engagement portion, and said body of said bracket includes a beam engagement portion accessible within said bore, whereby said bracket engagement portion and said beam engagement portion coact with each other when said beam is received within said bore to prevent said bracket from rotating about said beam, wherein said bracket engagement portion comprises a slot and said beam engagement portion comprises a projection adapted to be received within said slot, and
a pair of longitudinally spaced apart ribs arranged adjacent said first and second ends extending from said body into said bore, said ribs each having an edge surface, said edge surface of said ribs engaging said outer surface of said beam when said beam is received within said bore, whereby said bracket is positionable about said curved longitudinal axis of said beam.

12. The mounting apparatus of claim 11, wherein said beam is cylindrical in cross-sectional shape and said bore comprises a linear bore.

13. The mounting apparatus of claim 11, wherein said bracket engagement portion extends along the longitudinal axis of said beam.

14. The mounting apparatus of claim 11, wherein said beam engagement portion comprises a shaped projection extending from said body within said bore and said bracket engagement portion comprises a corresponding shaped opening within said beam adapted to receive said projection, whereby said bracket is prevented from sliding along said beam.

15. The mounting apparatus of claim 11, wherein said beam has a predetermined radius of curvature.

16. The mounting apparatus of claim 11, wherein said body further includes an opening and a bushing received within said opening.

17. The mounting apparatus of claim 16, wherein said bushing is threadingly received within said opening whereby the position of said bushing relative to said bracket is adjustable.

18. The mounting apparatus of claim 11, further including a support coupled to said beam for positioning said longitudinal axis of said beam in a horizontal plane.

* * * * *

UNITED STATES PATENT AND TRADEMARK OFFICE
CERTIFICATE OF CORRECTION

PATENT NO. : 7,665,699 B2
APPLICATION NO. : 10/871799
DATED : February 23, 2010
INVENTOR(S) : Odd N. Oddsen, Jr. and Bradley A. Derry It is certified that error appears in the above-identified patent and that said Letters Patent is hereby corrected as shown below:

In column 10, line 30, replace Claim 3 with the following Claim 3:

A mounting apparatus for an electronic device, said mounting apparatus comprising an elongated beam having a curved longitudinal axis, said beam having an outer surface and a bracket engagement portion; at least one bracket adapted to be coupled to an electronic device, said bracket including an upper bracket member pivotably attached to a lower bracket member forming a linear bore therebetween, one of said upper and lower bracket members including a beam engagement portion accessible within said bore, wherein said beam engagement portion comprises a shaped projection extending from said bracket within said bore and said bracket engagement portion comprises a corresponding shaped opening within said beam adapted to receive said projection, whereby said bracket is further prevented from sliding along said beam, said beam engagement portion coacting with said bracket engagement portion when said beam is received within said bore to prevent said bracket from twisting about said beam; first and second ribs extending from said upper and lower bracket members into said bore, said first ribs spaced longitudinally from said second ribs within said bore, said first and second ribs each having a curved edge surface adapted for engagement with said outer surface of said beam when said beam is received within said bore.

In column 10, line 34, replace Claim 4 with the following Claim 4:

The mounting apparatus of claim 1, wherein said bracket includes a locking assembly for securing said upper bracket member to said lower bracket member when in said closed position.

In column 10, line 37, replace Claim 5 with the following Claim 5:

The mounting apparatus of claim 1, wherein said bracket further includes an opening and a bushing received within said opening.

In column 10, line 40, replace Claim 6 with the following Claim 6:

The mounting apparatus of claim 5, wherein said bushing is threadingly received within said opening whereby the position of said bushing relative to said bracket is adjustable.

CERTIFICATE OF CORRECTION (continued)
U.S. Pat. No. 7,665,699 B2

In column 10, line 43, replace Claim 7 with the following Claim 7:

The mounting apparatus of claim 1, further including a support coupled to said beam for positioning said beam in a horizontal plane.

Signed and Sealed this

Thirteenth Day of April, 2010

David J. Kappos
*Director of the United States Patent and Trademark Office*